(12) United States Patent
Smith et al.

(10) Patent No.: US 6,635,231 B2
(45) Date of Patent: Oct. 21, 2003

(54) PREPARATION OF ARSENIC PENTAFLUORIDE

(75) Inventors: W. Novis Smith, Philadelphia, PA (US); Joel McCloskey, Phildelphia, PA (US)

(73) Assignee: Lithdyne International, Anaheim, CA (US)

( * ) Notice: Subject to any disclaimer, the term of this patent is extended or adjusted under 35 U.S.C. 154(b) by 343 days.

(21) Appl. No.: 09/799,964

(22) Filed: Mar. 6, 2001

(65) Prior Publication Data

US 2002/0127174 A1 Sep. 12, 2002

(51) Int. Cl.$^7$ .................................................. C01B 9/08
(52) U.S. Cl. .......................... 423/489; 423/491; 423/522
(58) Field of Search ................................ 423/489, 491, 423/522

(56) References Cited

U.S. PATENT DOCUMENTS

| | | | | | |
|---|---|---|---|---|---|
| 2,952,514 | A | * | 9/1960 | Smith | 423/489 |
| 3,875,292 | A | * | 4/1975 | Wiesboeck et al. | 423/472 |
| 4,034,069 | A | * | 7/1977 | Curtis | 423/489 |

* cited by examiner

*Primary Examiner*—Ngoc-Yen Nguyen
(74) *Attorney, Agent, or Firm*—John Lezdey & Associates

(57) ABSTRACT

A process for the preparation of high purity arsenic pentafluoride in high yield. The process uses sulfur trioxide or oleum and an excess of hydrogen fluoride to react arsenic acid or arsenic pentoxide in a reaction medium containing an excess of hydrogen fluoride to yield high purity arsenic pentafluoride as a gas.

13 Claims, No Drawings

PREPARATION OF ARSENIC PENTAFLUORIDE

BACKGROUND FOR THE INVENTION

1. Field of the Invention

This invention relates to the preparation of anhydrous high purity arsenic pentafluoride in high yield.

2. Description of the Prior Art

Known processes for the production of arsenic pentafluoride include:

1. The fluorination of arsenic fluoride,
   $$As\ F_3 + F_2 \rightarrow As\ F_5$$

2. Fluorination of arsenic,
   $$2\ As + 5\ F_2 \rightarrow 2\ As\ F_5$$

U.S. Pat. No. 3,875,292 to Wiesboeck et al. discloses the preparation of Arsenic pentafluoride and fluoroarsenic acids by fluorinating an arsenic source selected from arsenic acid and monofluoroarsenic acid.

Therefore, there exists a need to provide high purity arsenic pentafluoride in a simple and economical procedure without the need for extensive fractionation or high-pressure equipment and not to have extensive acid gases present that require special disposal.

SUMMARY OF THE INVENTION

In accordance with the present invention, high purity arsenic pentafluoride can be produced in high yield without resorting to complex process operations. The critical feature of the present invention is affecting the reaction of arsenic acid or arsenic pentoxide in a reaction medium comprising hydrogen fluoride to form high purity arsenic pentafluoride in yields of 65 to 100 weight percent (based on contained arsenic). The yield based on fluoride content is also calculated to be about 90 to 99 percent. Preferably the process is conducted under a dry atmosphere, at autogenous pressures and moderate temperatures.

In one preferred embodiment the process involves a two step process: first preparing hexafluoroarsenic acid by effectively reacting arsenic acid or arsenic pentoxide with a stoichiometric excess of anhydrous hydrogen fluoride and then in the second step, effectively reacting the so formed hexafluoroarsenic acid with oleum (65% $SO_3$) or $SO_3$ to react with the formed water from the first step in a reaction medium comprising the unreacted excess hydrogen fluoride from the first reaction step to form arsenic pentafluoride. Then the $AsF_5$ is distilled from the mixture. All fluoride containing compounds other than the arsenic pentafluoride product may be condensed and recycled to the reactor for the next reaction.

More specifically in a preferred embodiment, the process for producing arsenic pentafluoride according to the invention comprises the steps of:

a) adding an excess of anhydrous hydrogen fluoride above a stoichiometric amount to arsenic acid or arsenic pentoxide to effect reaction in a preferably dry atmosphere to form hexafluoroarsenic acid in the unreacted excess of hydrogen fluoride; alternatively, the arsenic acid or arsenic pentoxide may be added to the hydrogen fluoride;

b) reacting the formed hexafluoroarsenic acid with oleum or $SO_3$ which reacts with the formed water from the first step while in contact with the unreacted excess of hydrogen fluoride to form substantially pure arsenic pentafluoride; and c) recovering the pure arsenic pentafluoride and hydrofluoric acid by distillation.

Optionally, the recovered hydrofluoric acid may be recycled by being added to supplement the amount of hydrogen fluoride to be used in the next preparation batch in the first step of the process.

Alternatively, in another preferred embodiment, hexafluoroarsenic acid can be used as the starting material and effectively reacted with a stoichiometric amount oleum or $SO_3$ in a reaction medium of hydrogen fluoride to produce high purity arsenic pentafluoride in high yield which is recovered by distillation.

It is, therefore, an object of the present invention to provide an improved process for the preparation of high purity arsenic pentafluoride in high yield.

Another related object of the present invention is to provide a process which is highly efficient and economical in preparing arsenic pentafluoride.

A further object of the present invention is to provide a process which produces a minimum amount of hydrofluoric acid by-product.

Further objects and embodiments of the process of this invention will be more readily apparent from the following detailed description.

DETAILED DESCRIPTION OF THE PREFERRED EMBODIMENTS

The present invention is applicable to a process for the production of arsenic pentafluoride which involves hexafluoroarsenic acid either as a starting reactant or as an intermediate. The invention is first described in the context of a preferred process for such production in which the hexafluoroarsenic acid is produced as an intermediate.

This embodiment of the present process comprises two essential reaction steps: The first reaction step involves the formation of a more concentrated hexafluoroarsenic acid and the second reaction step relates to the production of high purity arsenic pentafluoride.

The theoretically required quantity of hydrogen fluoride necessary for the complete transformation of a arsenic acid or arsenic pentoxide into the hexafluoroarsenic acid $HAsF_6$ is available when the materials are present in a ratio corresponding to 6 molecules of hydrogen fluorine per atom of arsenic.

In the first reaction step an excess of anhydrous hydrogen fluoride which may range from 9 to 100% over the stoichiometric amount is reacted with arsenic acid or arsenic pentoxide to form hexafluoroarsenic acid and a water by-product, as shown by the following equation for arsenic pentoxide:

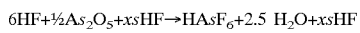
$$6HF + \tfrac{1}{2}As_2O_5 + xsHF \rightarrow HAsF_6 + 2.5\ H_2O + xsHF$$

xs=excess

When arsenic acid is used, the number of moles of water formed is slightly higher, based on the $HAsF_6$ formed as shown by the equation:

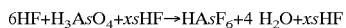
$$6HF + H_3AsO_4 + xsHF \rightarrow HAsF_6 + 4\ H_2O + xsHF$$

The second reaction step consists in adding oleum or $SO_3$ to the hexafluoroarsenic acid with the excess of anhydrous hydrogen fluoride present to form arsenic pentafluoride of high purity and is illustrated by the following equation:

$$xsHF + HAsF_6 + 4H_2O + 4SO_3 \rightarrow AsF_5 + xsHF + 4H_2SO_4$$

co products (1st rxn)

In a preferred operation of step one of the process, arsenic pentoxide is mixed in a closed system preferably under a dry atmosphere, such as nitrogen, dry air or argon at pressures less than 10 pounds per square inch with an excess of anhydrous hydrogen fluoride over the stoichiometric amount. It has been found when an excess of anhydrous hydrogen fluoride is added to a arsenic acid or arsenic pentoxide over the amount theoretically required to form the hexafluoroarsenic acid ($HAsF_6$), the yield of arsenic pentafluoride increases in the subsequent reaction step with oleum or $SO_3$. The mixing can be achieved by adding anhydrous hydrogen fluoride to the arsenic acid or arsenic pentoxide with adequate stirring and cooling. After the initial reaction, the arsenic acid or arsenic pentoxide becomes fluid and the reaction medium is maintained below 25° C. during the mixing operation to yield the hexafluoroarsenic acid, in the excess and unreacted hydrogen fluoride and resultant water.

To the resulting liquid hexafluoroarsenic acid and excess and unreacted hydrogen fluoride, in the same reactor a stoichiometric amount of oleum or $SO_3$ is gradually added with stirring while maintaining the temperature below 25° C. Usually only 80–90% of the theoretical amount of $SO_3$ is necessary to accomplish liberation of the $AsF_5$.

The stoichiometric amount of sulfur trioxide which is added to the hexfluoroarsenic acid is represented by a molecular rate within the range of one molecule of $SO_3$ for each molecule of water present. Traces of arsenic pentafluoride and hydrogen fluoride (HF) also begin to evolve at these conditions from the stirred liquid. The mixture of gases is then passed through a coating zone having a first cold trap, i.e., a fluorinated ethylene-propylene (FEP) tube maintained at temperatures of about 0° to 5° C. to condense gaseous materials such as anhydrous HF. After the arsenic pentafluoride passes through a first cold trap, it is directed to a second cold trap, i.e., another FEP tube cooled by a dry ice/acetone mixture and maintained at temperatures of about 0° to −40° C. and preferably about −20° to −40° C. to condense any hydrogen fluoride and other impurities from the gaseous arsenic pentafluoride stream. The recovered hydrogen fluoride can be reintroduced into the next production batch of hexafluoroarsenic acid. Following the completion of the addition of the oleum or $SO_3$, the temperature is gradually raised to about 150° C. with stirring to drive over the last traces of arsenic pentafluoride. All of the arsenic pentafluoride is evolved by temperatures over 150° C. Alternatively, the above-described process may be conducted with a single cold trap held at about −20to −40° C.

As indicated above, instead of adding excess hydrogen fluoride during the preparation of hexafluoroarsenic acid with arsenic acid or arsenic pentoxide, the distillate caught in the traps, particularly the first trap, can be added back in the preparation of the next batch of hexafluoroarsenic acid so that only 5 mole equivalence of a fresh feed of hydrogen fluoride are added with the rest of the hydrogen fluoride being recycled from the previous run.

The process of this invention may be conducted in either a batch or continuous operation.

The recycled hydrogen fluoride from a previous run is added in an amount equivalent to about one additional mole hydrogen fluoride plus a 25–50% overall excess.

$$xsHF + HAsF_6 + 2.5H_2O + 2SO_3(H_2SO_4) \rightarrow AsF_5 + xs\ HF + xsH_2SO_4$$

co products
(step a)

In the above equation, only the stoichrometric amount of hydrogen fluoride is consumed and essentially the only fluorine-containing final product is arsenic pentafluoride. Thus, the overall process according to this invention uses only stoichiometric amounts of hydrogen fluoride and arsenic pentoxide or arsenic acid while achieving consistently high yields (80–100%) of arsenic pentafluoride (based on arsenic used). There is virtually no waste in the process. The resulting purified arsenic pentafluoride was measured by trapping in diethyl ether at 0° C. and ambient pressure and weighed. It also can be used directly or condensed into gas cylinders for distribution.

The excess amount of anhydrous hydrogen fluoride may range from about 7 to 100 weight percent based on the amount of hexafluoroarsenic acid, which in turn is based on the amount of arsenic pentoxide or arsenic acid used. Preferably, hydrogen fluoride comprises from 20 to about 50 percent excess over stoichiometric.

The following example is illustrative of the practice of the method of the present invention. It will be understood, however, that it is not to be construed in any way limitative of the full scope of the invention, since various changes can be made without departing from the spirit of the teachings contained herein in light of the guiding principles which have been set forth above.

EXAMPLE

Into a 1-l Hastalloy reactor containing 115 g arsenic pentoxide (0.5 moles) at 5–10° C. was carefully added 160 g (8 moles) anhydrous hydrogen fluoride liquid over a one hour period with stirring with good cooling. Initially the reaction was very vigorous and the HF was added very slowly until enough liquid phase had formed so that the reaction could be stirred to eliminate hot spots. The addition rate could then be increased while cooling the reactor. The reaction mixture was stirred for 30 minutes after the addition was completed and maintained at about 10° C. All vapor formed at this point was passed through a FEP (Teflon) condensing tube maintained at about −45° C. to remove any entrained HF or other impurities. All non-condensable gases were then passed into and through 250 ml cold ether to absorb $AsF_5$ while stirring. All equipment was purged and dried under argon. Everything was maintained under a dry argon atmosphere. At this point, 280 g of 65% fuming sulfuric acid (oleum) was slowly added with stirring and cooling to maintain the Hastalloy reaction vessel at 10–15° C. When the addition was complete, the reactor was slowly heated to 150° C. to drive all of the $AsF_5$ off through the cooling condenser into the cold ether solution. The weight of the $AsF_5$ produced as measured from the weight gain of the ether was 144G or 85% yield. The recovered HF was used for recycling to the next run.

While in the foregoing specification we have set out specific procedures in considerable detail for the purpose of illustrating embodiments of the invention, it will be understood that such details may be varied widely by those skilled in the art without departing from the spirit of our invention.

What is claimed is:

1. A process for preparing arsenic pentafluoride which comprises the steps of a) reacting excess anhydrous hydrogen fluoride with arsenic pentoxide or arsenic acid to form hexafluoroarsenic acid, b) reacting the resultant product with oleum or sulfur trioxide, and then c) recovering arsenic pentafluoride.

2. The process of claim 1 wherein the excess amount of hydrogen fluoride is from about 7 to 100 weight percent based on the amount of contained hexafluoroarsenic acid.

3. The process of claim 2 wherein said excess amount of hydrogen fluoride ranges from 20 to 50 percent.

4. The process of claim 1 wherein oleum or sulfur trioxide is added to said hexafluoroarsenic acid at less than, or equal to a stoichiometric amount based on water present.

5. The process of claim 1 wherein the arsenic acid is used.

6. The process of claim 1 including passing all gases formed in step b) through a cooling zone to condense substantially all of the impurities except arsenic pentafluoride from other gaseous materials wherein said cooling zone comprises a first cooling sector maintained at a temperature from about 0° to 5° C. and a second cooling sector is maintained at a temperature from −20° to −40° C.

7. The process of claim 1 further comprising the step of recovering any excess hydrogen fluoride and introducing it to step a) to provide the excess hydrogen fluoride.

8. The process of claim 1 further comprising the step of passing the recovered arsenic pentafluoride into an ether solution.

9. A process for preparing arsenic pentafluoride which comprises the steps of:

a) reacting arsenic acid or arsenic pentoxide with about 7 to 100 weight percent excess of anhydrous hydrogen fluoride at a reaction temperature below 32° C. to form a solution of hexafluoroarsenic acid with excess hydrogen fluoride;

b) adding oleum or sulfur trioxide to the solution of hexafluoroarsenic acid in a molar ratio based on water content ranging from about 0.6 to 1.0 while maintaining the temperature below 32° C.;

c) increasing the temperature upon completion of the oleum or sulfur trioxide addition to about 150° C.;

d) passing an evolving gaseous stream through a plurality of cooling zones to separate gaseous arsenic pentafluoride from hydrogen fluoride and other entrained compounds; and then e) recovering substantially pure arsenic pentafluoride.

10. The process of claim 9 wherein the plurality of cooling zones comprises a first cooling sector maintained between about 0° C. to 5° C., and a second cooling sector maintained between about −20 to −40° C. to separate arsenic pentaflouride.

11. A process for preparing arsenic pentafluoride comprising the steps of:

a) reacting an excess of anhydrous hydrogen fluoride with arsenic acid to form hexafluoroarsenic acid in hydrogen fluoride;

b) reacting oleum with the product of step a) in contact with unreacted excess of hydrogen fluoride and heating to produce a gaseous stream consisting substantially of arsenic pentafluoride and hydrogen fluoride and then c) recovering arsenic pentafluoride.

12. The process of claim 11 wherein the temperature in step b) is gradually increased to about 150° C.

13. The process of claim 11 wherein said gaseous stream is passed through a cooling zone maintained in the range of about −20 to −40° C. temperatures.

* * * * *